Figure 1:
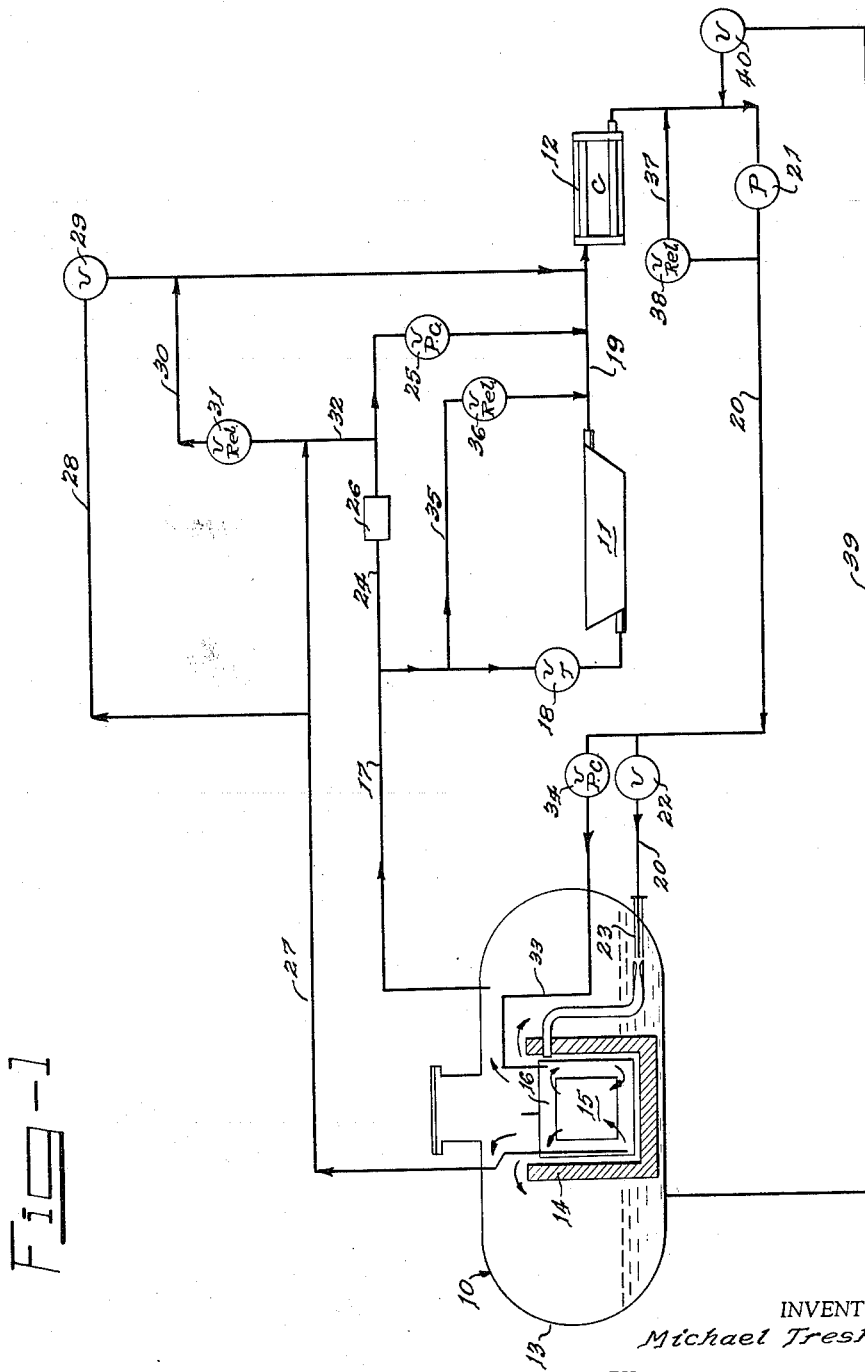

May 22, 1962 M. TRESHOW 3,035,993
REFLECTOR CONTROL OF A BOILING WATER REACTOR
Filed March 15, 1960 3 Sheets-Sheet 1

INVENTOR.
Michael Treshow
BY
Roland A. Anderson
Attorney

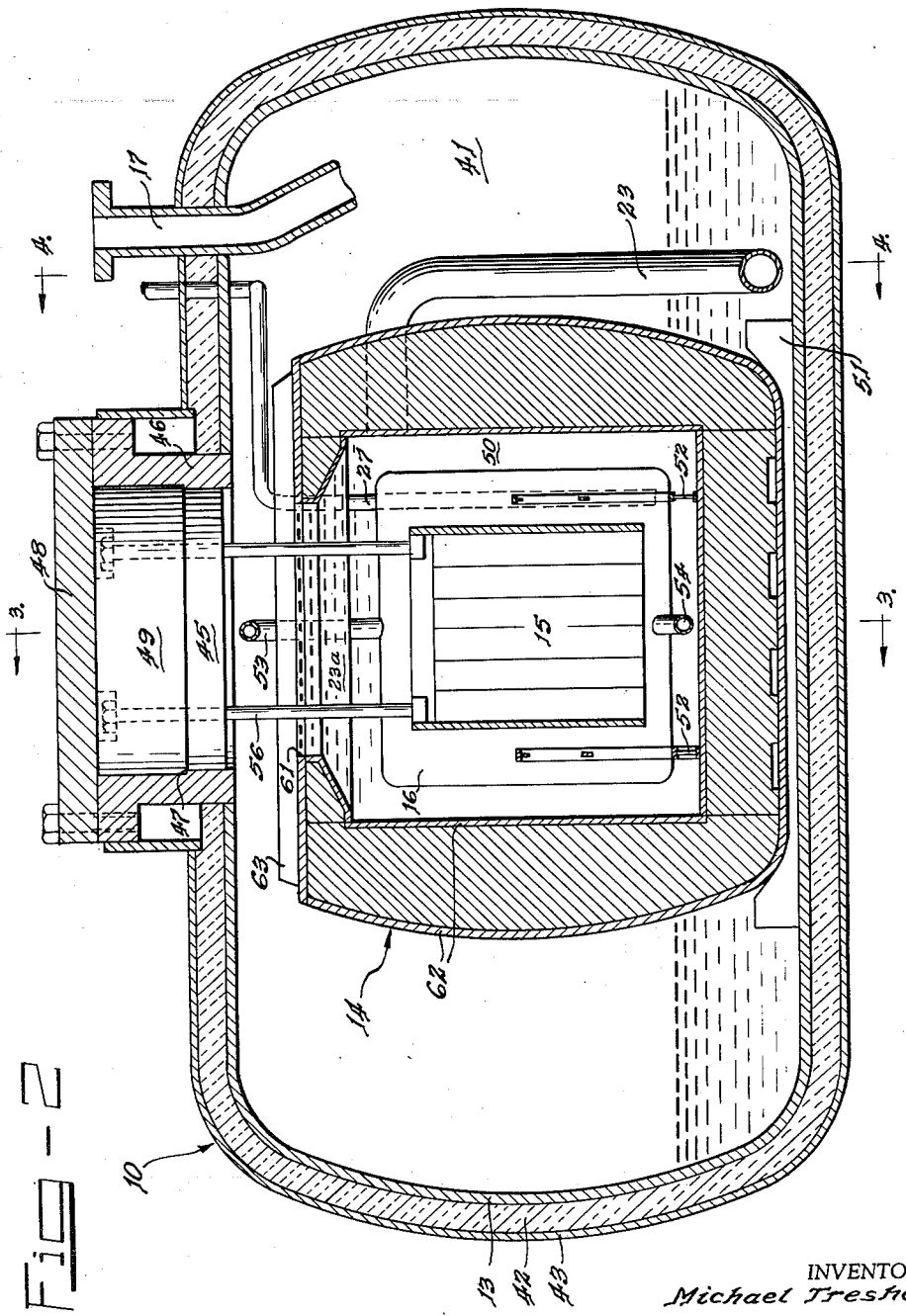

May 22, 1962 M. TRESHOW 3,035,993
REFLECTOR CONTROL OF A BOILING WATER REACTOR
Filed March 15, 1960 3 Sheets-Sheet 3
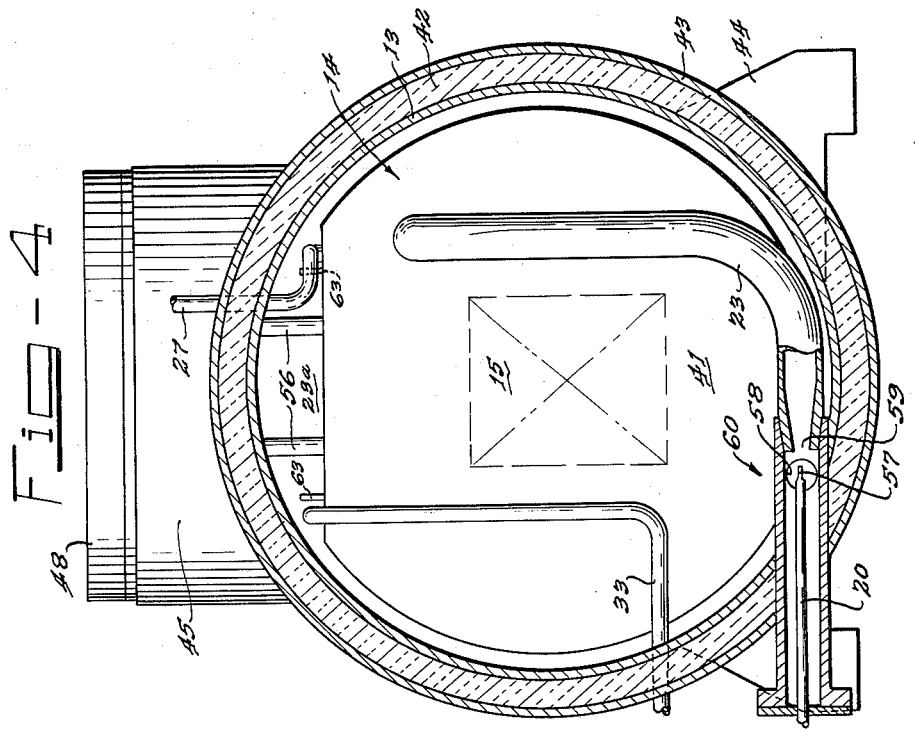
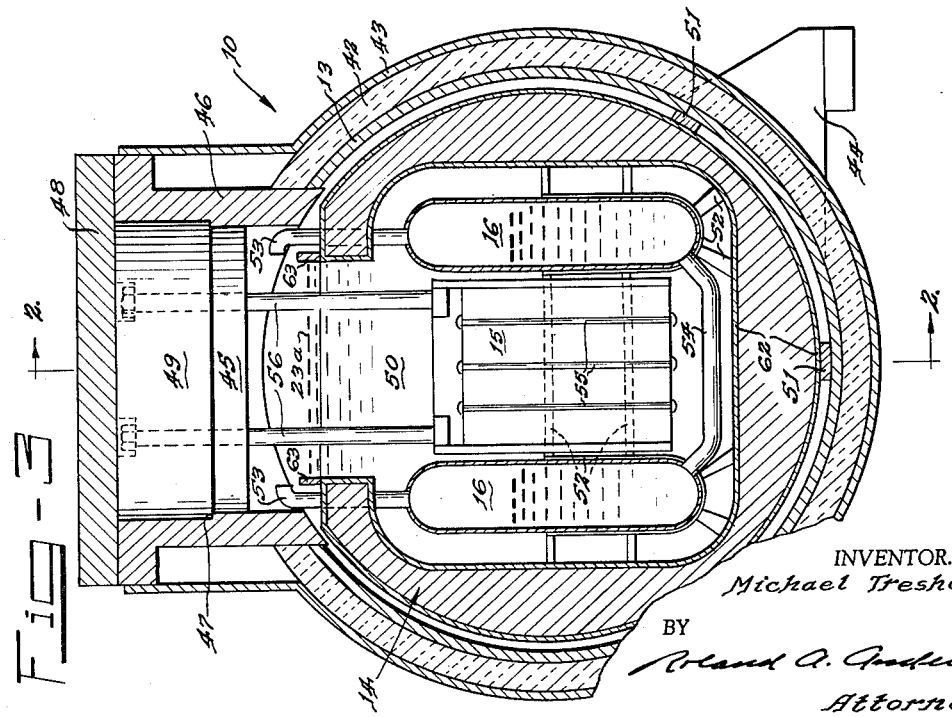
INVENTOR.
Michael Treshow
BY
Roland A. Anderson
Attorney 大
United States Patent Office 3,035,993
Patented May 22, 1962

3,035,993
REFLECTOR CONTROL OF A BOILING
WATER REACTOR
Michael Treshow, Del Mar, Calif., assignor to the United States of America as represented by the United States Atomic Energy Commission
Filed Mar. 15, 1960, Ser. No. 15,247
4 Claims. (Cl. 204—193.2)

This invention relates to nuclear reactors and nuclear power plants. In more detail the invention relates to a self-regulating, reflector-controlled, demand-responsive, boiling-water nuclear reactor. In still greater detail the invention relates to a nuclear reactor provided with a water reflector in which the height of the water reflector is controlled responsive to the pressure of steam in the reactor.

A boiling-water nuclear reactor is one in which fissioning of a nuclear fuel produces heat which boils water contained within the core of the reactor. The steam formed thereby may be used for any purpose desired such as to operate a steam turbine to generate power.

The terms "water" and "steam" as used throughout the specification and claims will be understood to include both hydrogen oxide ($H_2O$) and deuterium oxide ($D_2O$).

Nuclear reactors are capable of long-term operation without refueling and are therefore potentially useful in locations where long-term unmanned operation is desired. A boiling-water reactor is particularly suitable for such use because the negative temperature of reactivity of the reactor compensates to a considerable extent for reactivity changes. The negative coefficient of reactivity is not, however, sufficient of itself to compensate for all changes in reactivity that can occur in the reactor during the life of the core.

Incorporation of a burnable poison in the core of the reactor also assists in compensating for reactivity changes; in this case, the long-term effect of fuel burn-up and the combined effect of the negative temperature of reactivity of the reactor and the burnable poison present in the reactor reduce greatly the amount of control necessary. The compensation for reactivity changes obtained thereby is not perfect, however, particularly since changes in the demand for steam from the reactor change the reactivity of the reactor.

Changes in the demand for steam change the reactivity because the reactor core is disposed within a sealed pressure vessel in a boiling-water reactor, so that steam formation develops pressure within the pressure vessel. The magnitude of the pressure within the pressure vessel is determined not only by the reactivity of the reactor but also by the amount of steam withdrawn from the pressure vessel. If the demand for steam decreases, the pressure in the pressure vessel increases and if the demand increases, the pressure decreases.

A change in the steam pressure changes the temperature in the core and the size of the bubbles. The first of these effects enchances the self-regulating quality of the core but the second effect opposes the self-regulating quality of the core; and in the case of a high power reactor—one having a high proportion of the water occupied by steam bubbles—the second effect predominates. At low power levels the self-regulating tendency is only sufficient to take care of small changes in demand because the change in temperature and pressure necessary to compensate for a large change in demand would be greater than could be tolerated.

As a result a boiling-water reactor which is intended to operate untended over a period of time requires some means for regulating the power level to compensate for reactivity changes occurring therein.

Movable control elements of a material of high neutron capture cross section are conventionally used for this purpose but are not desirable for use in an untended reactor because they are susceptible to mechanical breakdown.

It is therefore an object of the present invention to develop a self-regulating nuclear reactor capable of maintaining a fixed power over an extended period of time without attention.

It is another object of the present invention to develop a nuclear power plant including a boiling-water reactor which is automatically regulated without relying on the movement of control rods or other moving bodies within the reactor.

The inventor has found that long-term unmanned operation of a boling-water nuclear reactor is possible with fully automatic power and reactivity control obtained by regulating the height of water in a top reflector and one or more side reflectors. The primary control is obtained from control of the height of water in the side reflector. Bypassing of steam around the turbine because of overpressure causes withdrawal of water from the side reflectors thereby resulting in reduction of reactivity while under pressure results in the addition of water to the reflectors. Secondary control is obtained by controlling the height of water above the top of the reactor. The height of water in this top reflector is automatically reduced in the case of excessive power surges or excessive steam pressure.

Additional objects of the present invention will become readily apparent from a further reading of this disclosure, particularly when viewed in the light of the drawings, wherein:

FIGURE 1 is a schematic diagram of a nuclear power plant illustrating the present invention, FIGURE 2 is a vertical sectional view of the nuclear reactor shown diagrammatically in FIGURE 1, FIGURE 3 is a sectional view taken in the direction of the arrows 3—3 in FIGURE 2, and FIGURE 4 is a sectional view taken in the direction of the arrows 4—4 in FIGURE 2.

As illustrated in FIGURE 1, the nuclear power plant includes a nuclear reactor 10, a steam turbine 11 and an exhaust steam condenser 12. Nuclear reactor 10 comprises a pressure vessel 13 which encloses an open-topped shielding container 14. Shielding container 14 encloses core 15 and two side reflector tanks 16 of which only one is shown in this figure. Steam line 17, containing throttle valve 18, leads steam developed in the pressure vessel 13 to turbine 11 while exhaust steam line 19 leads exhaust steam from turbine 11 to condenser 12. Feed-water line 20, containing pump 21 and valve 22, returns the condensed water from condenser 12 to reactor 10. Feed-water line 20 returns the water to inlet pipe 23 which penetrates the pressure vessel 13 near the bottom thereof and then extends upwardly to penetrate shielding container 14 just above the top of core 15. The water normally present above core 15 constitutes a top reflector 23a.

Steam bypass line 24 connects steam line 17 directly with condenser 12, thereby bypassing steam turbine 11. Bypass line 24 contains a pressure-controlled valve 25 and an orifice 26 on the upstream side of valve 25. Reflector outlet line 27 connects the bottom of one of the side reflector tanks 16 with condenser 12. It branches to form reflector drain line 28, containing valve 29, bypass line 30, containing safety valve 31, and control line 32. Drain line 28 and bypass line 30 connect directly with condenser 12 while control line 32 connects with steam bypass line 30 between valve 25 and orifice 26. Reflector inlet line 33 connects the top of the second reflector tank 16 with feed-water line 20 and contains a pressure-controlled valve 34 therein. A safety line 35 containing safety valve 36 is also provided connecting steam line 17 with condenser 12. Likewise pump relief line 37, containing pump relief valve 38, is provided. Finally cleanup line 39 provided with valve 40 connects the bottom of pressure vessel 13 to the intake side of pump 23.

The system described so far pertains to primary control of the reactor and operation thereof will next be described.

In operation of the nuclear power plant throttle valve 18 is governed to maintain constant turbine speed of the turbine 11. A pressure in steam line 17 which is higher than a predetermined pressure, which may be for example 300 pounds, opens steam bypass valve 25 in steam bypass line 24 and produces a steam flow and pressure drop through orifice 26 ahead of bypass valve 25. The lower pressure at the downstream side of the orifice 26 draws water through reflector outlet line 27 until the level of water in reflector tanks 16 is low enough to reduce the reactivity of the reactor to eliminate the excess pressure to allow the steam bypass valve 25 to close again. When the steam pressure falls below the desired operating pressure, steam pressure control regulating valve 34 on reflector inlet line 33 gradually opens and admits a flow of water to the reflector 16 from the feed-water line 20. A pressure greater than another, higher, predetermined pressure, such as 350 pounds, opens safety valve 31 on bypass line 30, so that water from the reflector will discharge directly into the condenser 12. Steam safety valve 36 in line 35 is likewise designed to open at this same pressure to permit steam to pass directly from pressure vessel 13 to condenser 12, bypassing steam turbine 11. Also the reflector tanks 16 can be drained through line 28.

The reactor structure will next be described with reference to FIGURES 2 to 4 of the drawing. Pressure vessel 13 is a horizontally disposed cylinder, having dished heads at each end, which encloses steam chamber 41. Pressure vessel 13 is surrounded by insulating material 42 which is held in place by retaining shell 43. Pressure vessel 13 rests on support members 44 and the reactor is surrounded, as usual, by a biological shield, not shown.

An access port 45 for the pressure vessel 13 is defined by a cylindrical member 46 having an interior ledge 47 therein. Access port 45 is provided with a cover 48 while a shield plug 49 rests on ledge 47 in port enclosure 46.

Shielding container 14 encloses reflector compartment 50 and is held in position within pressure vessel 13 by supports 51. Shielding container 14 consists of relatively thick side, bottom and end heavy metal castings forming an open-top container which also serves as a shield. The side castings extend around and over side reflector tanks 16 leaving opening 61 just above core 15. The castings may be lined interiorly and exteriorly with a corrosion-resistant material 62. Baffles 63 extend lengthwise of shielding container 14 at both sides of opening 61 in the shielding container. Coolant channels, not shown, may be provided as desired in the walls of shielding container 14. Provision of interior shielding in this fastion greatly reduces the amount of shielding necessary around the pressure vessel.

Side reflector tanks 16 rest on and are supported by support racks 52 within the reflector compartment 50. Each of the reflector tanks 16 is provided with a vent pipe 53 at the top thereof to equalize the pressure in the reflector tank with that in the steam chamber 41 while the reflector tanks are connected at their bottom by pipe 54 to equalize the level of water in the tanks.

Reactor core 15 is a conventional nuclear reactor core. Its only characteristics of importance are vertical coolant channels 55. It may, for example, be constructed similarly to the Experimental Boiling Water Reactor core which is described in ANL–5607, obtainable from the United States Government Printing Office, Washington 25, D.C.

Core 15 is supported from shield plug 49 by four stay bolts 56.

As is shown in FIGURE 4 feed-water line 20 extends axially of inlet pipe 23 and terminates in a nozzle 57 which is located opposite an opening 58 in inlet pipe 23. There is a constriction 59 in inlet pipe 23 on the downstream side from opening 58. Nozzle 57, opening 58, and constriction 59 form a jet 60, the purpose of which will be described hereinafter.

Operation of the reactor will be described next. Circulation of water through the core 15 is by natural convection. Water flows upwardly through the channels 55 and down, for the greater part, along the two end surfaces of the core. Some of the flow, however, goes over and around the two reflector tanks 16 placed close to the longitudinal sides of the core.

The main stream of feed water enters the reactor through feed-water line 20. The water is directed through construction 59 by means of nozzle 57 and draws a steady flow of water from the interior of pressure vessel 13 through opening 58. The combined flow of water is carried into reflector compartment 50 by inlet pipe 23 and maintains the water level therein normally at the top of the shielding container 14. This water constitutes top reflector 23a for the reactor. There is normally a flow of water over the ends of the shielding container 14 while the baffles 63 normally prevent flow over the sides. Thus the height of water above the core 15 is normally maintained constant. However, the water level in the pressure vessel 13 is allowed to vary.

The secondary control previously referred to comes about from reducing the height of water above the core 15. Only in the case of excessive power surges or in case of excessive steam pressure is top reflector 23a lowered. Power surges expel considerable amounts of water from the shielding container 14 together with the steam thereby lowering the water level. This water will only gradually be returned by jet 60.

In addition the feed-water pump 21 and pump relief valve 38 cooperate under excessive operating pressure to progressively slow down and then halt the feed-water flow through jet 60. At a desired overpressure the jet velocity will be zero and water will begin to drain from top reflector 23a through opening 58 in inlet pipe 23 into steam chamber 41 until the reactivity loss causes the steam pressure to return to the desired level. The position of the inlet pipe 23 with respect to the top of shielding container 14 determines the permitted minimum level.

In case of sudden, major rises in power or steam pressure the following events will take place.

(1) The inherent lowering of the level of water in top reflector 23a in case of major surges which has just been described.

(2) An extra high flow rate of bypassed steam will increase the pressure drop across the orifice 26 and thereby increase the water flow out of side reflector tanks 16.

(3) A pressure greater than 350 pounds opens safety valve 31 on bypass line 30 which will discharge water directly from the reflector tanks 16 into the condenser 12.

(4) Steam safety valve 36 will open when the pressure rises sufficiently and discharge steam directly into the condenser.

The ultimate scram is the fast expulsion of water from the core inherent with boiling-water reactors.

To start up the reactor with cold water the level of water must be raised slowly while nuclear instruments are used to watch for criticality. Water is kept out of the side reflector tanks 16 which are shut off manually until the reflector compartment 50 has been filled by water admitted through the jet 60. When the reflector compartment 50 is filled to overflow excess water is permitted to circulate back to the feed pump 21 by, manually, opening the cleanup line 39 which allows the pump to assume normal operation. (Later on when the temperature is up and steam has reached the condenser, this line is gradually closed again.) If criticality has not yet been reached when top reflector 23a is full, the side reflector tanks 16 can be filled partially by slowly letting water through valve 34 till the instruments indicate criticality. The water is allowed to heat slowly while more water is admitted to make up for increasing temperature. The normal steam valves will be closed while a pressure is building up in the system.

Normal shutdown can be carried out by closing reflector inlet valve 34 and opening up valve 29 in reflector drain line 28 which will drain reflector tanks 16 into the condenser. Thereafter feed-water valve 22 is closed to the jet 60 and top reflector 23a drains back to the steam chamber 41. This shutdown procedure can be carried out manually or automatically through remote control, if desired.

Boron additions are made to the core to compensate substantially for fuel burnup during several years of operation. The automatic control system according to the present invention takes care of other changes occurring during the life of the reactor. For the startup period, the top reflector has a control capacity about equal to the reactivity loss from heating the water to the point of boiling while the filling of the side reflectors approximately makes up for the steam voids due to boiling and the reactivity losses due to xenon.

When xenon and samarium have reached equilibrium the relative boron and fuel burnout will gradually increase the reactivity and this, in turn, will cause the side reflector water level to recede slowly.

The pressure vessel is 9 feet long inside with an internal diameter of 4½ feet. The core has an active height of 18 inches and a cross section 18 inches by 16 inches, while the side reflector tanks are 7½ inches thick and extend several inches above and below the top and bottom of the core. A power level of 1.5 megawatts for the core would be reached at a power density of 26 kw. per liter of channel volume. This will produce about 150 kw. turbine power with 300 p.s.i. at the throttle and atmospheric exhaust pressure.

It will be understood that this invention is not to be limited to the details given herein but that it may be modified within the scope of the appended claims.

What is claimed is:

1. A power plant comprising a boiling-water nuclear reactor, a steam turbine, a steam line connecting the reactor and turbine, a condenser, a spent steam line connecting the turbine and the condenser, a bypass line containing a valve and an orifice on the upstream side of the valve directly connecting the reactor with the condenser, said valve being set to open when the pressure in the reactor exceeds a predetermined value, a water reflector in the reactor, a reflector inlet line, a reflector outlet line, and a line connecting the reflector outlet line with the bypass line between the orifice and the valve.

2. In a power plant comprising a boiling-water nuclear reactor including a reflector, a steam turbine, and a spent steam condenser, the improvement comprising means for controlling the reactor by controlling the reflector height comprising a direct line to the condenser from the reactor, a valve in said line set to open when the steam pressure exceeds a predetermined value, an aperture in said line on the upstream side of the valve, and a line from the reflector to the said direct line connecting thereinto between the said aperture and valve whereby an excess steam pressure in the reactor causes the valve to open thereby permitting steam to flow directly to the condenser from the reactor, which steam flow draws water out of the reflector thereby lowering the water level therein and reducing the reactivity of the reactor.

3. A boiling-water nuclear reactor comprising a pressure vessel, an open-top shielding container disposed in said pressure vessel, a core disposed within the shielding container, said shielding container extending above the top of the core, an inlet pipe for water penetrating the pressure vessel near the bottom thereof and extending upwardly to penetrate the shielding container just above the top of the core, a constriction in said inlet pipe, at a point near the bottom of the pressure vessel, an opening in said inlet pipe between said constriction and the entry point of the inlet pipe into the pressure vessel and a feed-water line terminating in a nozzle located at said opening and adapted to direct water through said constriction.

4. A power plant including a boiling-water nuclear reactor comprising a pressure vessel, a shielding container having an open top and being formed of relatively thick, heavy metal casting disposed within the pressure vessel, a core disposed within the shielding container, said core containing fissionable material disposed in fuel elements having vertical coolant channels therebetween, two reflector tanks capable of containing water disposed alongside of opposite sides of the core, said reflector tanks extending above the top of the core but stopping short of the top of the reactor container, a vent pipe extending from the shielding container to the interior of the pressure vessel above the top of the shielding container, a pipe connecting the bottoms of the reflector tanks, means for introducing water into the shielding container comprising a feed-water line terminating in a nozzle, an inlet pipe coaxial with said feed-water line and surrounding it penetrating the pressure vessel near the bottom thereof which receives water from said nozzle and has an opening therein opposite the nozzle and a construiction so located that the nozzle directs water through the constriction, said inlet pipe extending upwardly to penetrate the shielding container just above the top of the core, a reflector inlet line extending to the top of one of the reflector tanks, a reflector outlet line extending the to the bottom of the other reflector tank, a steam line connected to the top of the pressure vessel, a steam turbine driven by the steam from said steam line, a throttle valve in said steam line, a governor controlling said throttle valve to maintain constant turbine speed, an exhaust line leading from said turbine, a condenser connected to said exhaust line, a discharge line from said condenser including a feed-water pump, said discharge line being connected to said feed-water inlet line and said reflector inlet line, a valve in said reflector inlet line adapted to open when the pressure in the steam line drops below a predetermined figure, a steam bypass line containing an orifice and a valve on the downstream side of the orifice directly connecting the steam line with the condenser, said valve being designed to open when the pressure in the pressure vessel exceeds a predetermined pressure, and a line connecting said reflector outlet line with said steam bypass line between the orifice and the valve.

References Cited in the file of this patent
UNITED STATES PATENTS

| 2,861,033 | Treshow | Nov. 18, 1958 |
| 2,936,273 | Untermyer | May 10, 1960 |
| 2,949,414 | Ransohoff et al. | Aug. 16, 1960 |

OTHER REFERENCES

Leyse et al.: AECU-3775, An Advanced Engineering Test Reactor, USAEC report dated March 15, 1958, pages 20-22, 98, 99.

Nucleonics, vol. 14 (July 1956), pages 42-45.

Nucleonics, vol. 14 (April 1956), pages 106-109.